(12) United States Patent
Matsushita et al.

(10) Patent No.: US 7,519,121 B2
(45) Date of Patent: Apr. 14, 2009

(54) OFDM DEMODULATION CIRCUIT AND OFDM RECEPTION APPARATUS USING THE SAME

(75) Inventors: Yoshiteru Matsushita, Chiba (JP); Kimihiko Imamura, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 684 days.

(21) Appl. No.: 10/491,531

(22) PCT Filed: Oct. 4, 2002

(86) PCT No.: PCT/JP02/10381

§ 371 (c)(1),
(2), (4) Date: Apr. 2, 2004

(87) PCT Pub. No.: WO03/032544

PCT Pub. Date: Apr. 17, 2003

(65) Prior Publication Data

US 2004/0247044 A1 Dec. 9, 2004

(30) Foreign Application Priority Data

Oct. 4, 2001 (JP) ............................. 2001-308519

(51) Int. Cl.
*H04K 1/10* (2006.01)
(52) U.S. Cl. ........................................ 375/260; 375/324
(58) Field of Classification Search ................ 375/260, 375/316, 355, 324, 327, 325, 362, 340, 342, 375/343, 142, 150
See application file for complete search history.

(56) References Cited

U.S. PATENT DOCUMENTS

| 5,602,835 | A | * | 2/1997 | Seki et al. | 370/206 |
|---|---|---|---|---|---|
| 5,737,361 | A | * | 4/1998 | Park et al. | 375/149 |
| 5,767,738 | A | * | 6/1998 | Brown et al. | 329/304 |
| 6,037,835 | A | * | 3/2000 | Smith et al. | 329/316 |
| 6,415,152 | B1 | * | 7/2002 | Chung | 455/446 |
| 6,546,058 | B1 | * | 4/2003 | Gilhousen et al. | 375/285 |
| 6,549,589 | B1 | * | 4/2003 | Tsuruoka | 375/343 |
| 6,563,896 | B1 | * | 5/2003 | Nomura et al. | 375/364 |

(Continued)

FOREIGN PATENT DOCUMENTS

JP 9-214464 A 8/1997

(Continued)

*Primary Examiner*—Emmanuel Bayard
(74) *Attorney, Agent, or Firm*—Birch, Stewart, Kolasch & Birch, LLP

(57) ABSTRACT

An OFDM demodulation circuit capable of initiating a demodulation process within a short period of time after the reception of a signal and terminating the demodulation early if it has been initiated erroneously, and an OFDM reception apparatus employing the OFDM demodulation circuit. If a threshold value Sth2 in peak detector 122 is not exceeded within a predetermined time T following the output of a symbol timing signal from peak detector 121, namely if a continuation timing signal is not supplied from peak detector 122 to a demodulation process terminating circuit 162 before demodulation process terminating circuit 162 counts predetermined time T (step S115), demodulation process terminating circuit 162, determining that the position at which the demodulation process has been started was wrong, terminates the currently executed demodulation process soon after the completion of the counting of predetermined time T and returns to a received-signal awaiting state (step S111).

10 Claims, 16 Drawing Sheets

U.S. PATENT DOCUMENTS

| | | | | |
|---|---|---|---|---|
| 6,731,702 | B1* | 5/2004 | Nomura | 375/343 |
| 6,829,291 | B1* | 12/2004 | Imaizumi | 375/150 |
| 6,999,406 | B2* | 2/2006 | Takahashi et al. | 370/208 |
| 7,020,116 | B1* | 3/2006 | Nakada | 370/338 |
| 7,149,266 | B1* | 12/2006 | Imamura et al. | 375/355 |
| 7,336,738 | B2* | 2/2008 | Wakamatsu | 375/343 |
| 2002/0105903 | A1* | 8/2002 | Takahashi et al. | 370/208 |
| 2003/0053550 | A1* | 3/2003 | Peyla et al. | 375/267 |
| 2004/0013209 | A1* | 1/2004 | Zehavi et al. | 375/334 |
| 2005/0094719 | A1* | 5/2005 | Young | 375/222 |

FOREIGN PATENT DOCUMENTS

| | | |
|---|---|---|
| JP | 10-164161 A | 6/1998 |
| JP | 11-145930 A | 5/1999 |
| JP | 2001-53715 A | 2/2001 |
| JP | 2001-251275 A | 9/2001 |

* cited by examiner

OFDM DEMODULATION CIRCUIT AND OFDM RECEPTION APPARATUS USING THE SAME

This Nonprovisional application claims priority under 35 U.S.C. § 119(a) on Patent Application No. 2001-308519 filed in Japan on Oct. 4, 2001, the entire contents of which are hereby incorporated by reference.

TECHNICAL FIELD

The present invention relates to an OFDM (Orthogonal Frequency Division Multiplexing) demodulation circuit adapted for the OFDM transmission scheme used in wireless communication systems, and an OFDM reception apparatus using the OFDM demodulation circuit.

BACKGROUND ART

An example of a conventional OFDM demodulation circuit is disclosed in JP Patent Publication (Kokai) No. 11-145930 A (1999).

FIG. 9 shows an example of the frame format of a packet used in the conventional OFDM demodulation circuit.

At the head of the frame of a packet P, a preamble signal is attached that is used for carrier frequency error detection, symbol synchronization or other purposes. The preamble signal is formed by a repetition of two identical, known start symbols SS.

These two start symbols SS as the preamble signal are followed by the repetition of a guard interval GI and a data symbol DS in packet P.

The two start symbols SS as the preamble signal and the data symbols DS each have a length of interval Tw on the time axis. This length Tw is the same as the width of the window for IFFT (Inverse Fast Fourier Transform) and FFT (Fast Fourier Transform) that are used for modulating and demodulating an OFDM signal, which will be described later.

Guard interval GI is inserted before data symbol DS in order to eliminate the influence of delayed waves. The length of its interval on the time axis is Tw/4 in this example.

FIG. 10 shows a block diagram of a conventional OFDM modulation circuit.

In conventional OFDM modulation circuit 400, an input information signal is fed to a serial-parallel converter 401 and is converted into information signals for each sub-carrier.

Output signals (information signals for sub-carriers) from serial-parallel converter 401 are fed to code modulators 402 and are subjected to code modulation, such as QPSK (Quadri-Phase Shift Keying).

Output signals (code-modulated information signals for individual sub-carriers) from coded demodulators 402 are fed to an IFFT converter 403 and are IFFT-converted into digital modulated waves having time-axis waveforms.

Output signals (digital modulated waves) from IFFT converter 403 are fed to a guard interval insertion circuit 404, where a guard interval GI is attached to them.

Output signals (data symbols DS to which guard intervals GI are attached) from guard interval insertion circuit 404 are converted into serial data in a parallel-serial converter 405.

An output signal from serial-parallel converter 405 is fed to an input switching circuit 406 which outputs an OFDM modulated signal while switching between the output signal from parallel-serial converter 405 and a preamble signal read from memory circuit 407.

The output signal from input switching circuit 406, namely the OFDM modulated signal as shown in FIG. 9, is fed to a D/A converter 408 and is converted into an analog signal, which is then outputted as a modulation baseband signal.

FIG. 11 shows a block diagram of a conventional OFDM demodulation circuit.

In conventional OEDM demodulation circuit 500, an OFDM reception signal that is obtained by A/D converting a received signal (modulation baseband signal that has been received) is fed to a delay circuit 501, a multiplier 503, a squarer 513, and a delay circuit 551.

The OFDM received signal fed to delay circuit 501 is delayed by the aforementioned time Tw.

An output signal from delay circuit 501 is fed to a complex conjugate signal generating circuit 502.

A conjugate complex signal generated in complex conjugate signal generating circuit 502 is subjected to complex multiplication with the current received signal in multiplier 503, thereby calculating a crosscorrelation value between those signals. An output signal from multiplier 503 is fed to a moving average filter 504.

In moving average filter 504, the output of multiplier 503 is moving-averaged to perform averaging over time Tw. An output signal from moving average filter 504 is fed to squarer 505 and converted into an electric power signal. An output signal from squarer 505 is fed to a peak detector 521.

The OFDM received signal fed to squarer 513 is squared therein and is then fed to moving average filter 514 as an autocorrelation value.

In moving average filter 514, the output of squarer 513 is moving-averaged to perform averaging over time Tw. An output signal from moving average filter 514 is fed to squarer 515 and converted into an electric power signal. An output signal from squarer 515 is fed to a peak detector 521.

In peak detector 521, to which input signals are fed from moving average filters 504 and 514 via squarers 505 and 515, respectively, peak detection is performed using these input signals (electric power signals).

Peak detector 521 determines a peak based on the magnitude of a signal obtained by dividing the output signal from squarer 505 by the output signal from squarer 515, for example. Peak detector 521 then outputs a symbol timing signal that indicates the timing at which the peak is detected.

Specifically, the fact that the peak has been detected in peak detector 521 indicates that a packet of the OFDM received signal has been received. Thus, based on the symbol timing signal, a process is initiated for demodulating the received packet of the OFDM received signal.

Thus, it can be said that aforementioned delay circuit 501, complex conjugate signal generating circuit 502, multiplier 503, moving average filter 504, squarers 505 and 513, moving average filter 514, squarer 515 and peak detector 521 together constitute a symbol timing signal detector 530.

Using the symbol timing signal from peak detector 521 and the output signal from moving average filter 504, a carrier frequency error detector 541 detects a carrier frequency error.

Meanwhile, an FFT window control circuit 542 outputs a control signal for window timing control, in accordance with the symbol timing control signal from peak detector 521.

While the above-described signal processing is performed by symbol timing signal detector 530, carrier frequency error detector 541 and FFT window control circuit 542, the OFDM received signal is delayed by delay circuit 551 and is then outputted to a phase rotator 552.

Based on the input of the control signal from FFT window control circuit 542, phase rotator 552 rotates the phase of an output signal from delay circuit 551 in accordance with an output signal from carrier frequency error detector 541. The frequency offset of the OFDM received signal is thus compensated for before the signal is fed to a guard interval eliminating circuit 553.

Based on the symbol timing signal, guard interval eliminating circuit 553 removes guard interval GI from the output signal from phase rotator 552, namely the OFDM received signal in which the frequency offset has been compensated for.

In serial-parallel converter 554, the output signal from guard interval eliminating circuit 553, namely the OFDM signal from which the guard intervals GI have been removed, is serial-to-parallel converted, thereby turning the OFDM received signal back into code-modulated information signals for individual sub-carriers, which are then fed to an FFT converter 555.

FFT converter 555 fast Fourier-converts the signal supplied from serial-parallel converter 554, thereby demodulating the time-domain signal into a frequency-domain signal. The thus demodulated code-modulated information signal is fed to a parallel-serial converter 556.

The code-modulated information signals converted by parallel-serial converter 556 into serial data are then fed to an error correction demodulator 557. Error correction demodulator 557 performs error-correction demodulation and outputs a demodulated input information signal (received information data) as an output signal.

An error detector 558 receives the output signal from error correction demodulator 557, namely the demodulated input information signal, and carries out error detection for the received signal.

In the aforementioned conventional OFDM demodulating circuit 500, a correlation value between the OFDM received signal and the OFDM received signal delayed by time Tw is obtained. Time Tw is used as analysis time within which time moving average filters 504 and 514 perform averaging calculations.

FIG. 12 shows the temporal changes in the magnitude of the correlation value between the OFDM received signal and the OFDM received signal that has been delayed by time Tw as these signals are fed to moving average filters 504 and 514.

In the above-described conventional OFDM demodulation circuit 500, it is determined that a peak of the correlation value for initiating a demodulating process has been detected when the magnitude of the correlation value between the OFDM received signal and the OFDM received signal with delay time Tw, i.e., the magnitude of the correlation value between the output of moving average filter 514 and that of moving average filter 504, exceeds a predetermined threshold value Sth. Upon detection of the peak, a demodulation process is initiated.

FIG. 13 shows a flowchart of the processes performed in the conventional OFDM demodulation circuit 500.

OFDM demodulation circuit 500 performs various computing processes on the received signal (modulation baseband signal) for detecting the symbol timing signal in a received-signal awaiting state, such as delay computation, moving-average computation, and correlation computation (step S511). Upon detection of a peak of the magnitude of the correlation value between the OFDM received signal and the OFDM received signal with delay time Tw in the peak detecting process, namely, when it is detected that the correlation value has exceeded the threshold value Sth (step S512), the demodulation process is initiated (step S513).

By using the timing of this peak detection as the symbol timing, timing control for the FT window and the carrier-frequency error detection, for example, are conducted. Consequently, the OFDM received signal is FFT-processed by having its guard intervals GI removed, and the code-modulated information signal is subjected to error-correcting demodulation. The result of the error-correcting demodulation, i.e., the input information signal that has been demodulated, is subjected to the error detection process in an error detector 558 (step S 514).

If an error is detected by error detector 558 in the thus demodulated input information signal (step S 515), the information data that has been demodulated up to this point in time since the last peak detection is abandoned, and the routine returns to the received-signal awaiting state (step S 511).

If, on the other hand, no error is detected by error detector 558 in the demodulated input information signal, the information data that has been demodulated up to this point in time is outputted (step S 516).

As another example of the conventional OFDM demodulation circuit, an OFDM demodulation circuit of the unique-word delay detection scheme is disclosed in JP Patent Publication (Kokai) No. 10-164161 A (1998).

FIG. 14 shows a frame format of a packet used in the OFDM demodulation circuit of the unique-word delay detection scheme.

Each packet P is provided with a unique word UW at the start, followed by data D.

FIG. 15 shows a block diagram of a unique word delayed detection circuit applied to the OFDM demodulation circuit.

To the unique word delayed detection circuit (to be hereafter referred to as a UW delayed detection circuit) 600, a quasi-synchronous detection signal and a unique word input signal (to be hereafter referred to as a UW input signal) that repeats the same signal sequence as that of a unique word UW in the quasi-synchronous detection signal are inputted.

The quasi-synchronous detection signal is a signal obtained by subjecting a OFDM modulation signal into which a known unique word UW is inserted to quasi-synchronous detection. Specifically, the quasi-synchronous detection signal is obtained by synchronously detecting the OFDM modulated signal using a local oscillator signal independent from the OFDM modulated signal and with a frequency that is very close to the OFDM modulated signal, thereby demodulating the OFDM modulated signal into the baseband signal. Between the carrier wave of the OFDM modulated signal and the local oscillator signal, there generally exists a carrier frequency offset.

This quasi-synchronous detection signal, which is a double-row signal consisting of an in-phase signal and a orthogonal signal, is fed to a delay circuit 601 and delayed by N symbols (N being an arbitrary positive number).

An output signal from delay circuit 601 is fed to a complex conjugate signal generating circuit 602 and there subjected to complex conjugation.

In a multiplier 603, an output signal from complex conjugate signal generating circuit 602 is multiplied with the quasi-synchronous detection signal, i.e., the quasi-synchronous detection signal is subjected to N-symbol complex conjugate delay detection. The result of multiplication, namely an N-symbol complex conjugate delay detection signal of the quasi-synchronous signal, is fed to a correlator 620.

On the other hand, the UW input signal is N-symbol delayed in a delay circuit 611 while it is subjected to complex conjugation in a complex conjugate signal generating circuit 612.

In a multiplier 613, the output signals from these are multiplied to thereby subject the UW input signal to N-symbol complex conjugate delay detection. The result of multiplication, namely an N-symbol complex conjugate delay detection signal of the unique word UW, is fed to correlator 620.

In correlator 620, crosscorrelation is determined between the N-symbol complex conjugate delay detection signal of the quasi-coherent signal and the N-symbol complex conjugate delay detection signal of the unique word UW, over the entire length of all of the symbols of the unique word UW, as they are fed from multipliers 603 and 613.

FIG. 16 shows a block diagram of a conventional signal detection circuit to which the UW delay detection circuit 600 of FIG. 15 is applied.

In order to detect the position of the unique word UW and to extend the range of measurement while maintaining the frequency-offset measurement accuracy, signal detection circuit 700, which is based on UW delay detection circuit 600 of FIG. 15, has different operation modes. One is an initial acquisition mode (to be hereafter referred to as an IA mode), in which different UW delay detection circuits ("DDD(N)" and "DDD(N/2)" 720 and 730 with different numbers of delay symbols N and N/2 (where $0.5<N\leq 1$), respectively, are provided. The other is a fine-tuning acquisition mode (to be hereafter referred to as an FA mode), in which a UW delay detection circuit ("DDD(4N)") 740 where the number of delay symbols is 4N is provided.

In signal detection circuit 700, a first quasi-synchronous detection signal is fed to a sampler 701 as an input signal. Sampler 701 generates an output signal based on a sampling signal supplied from a sampling signal generator 702. The first quasi-synchronous detection signal is a signal obtained by subjecting an orthogonal modulated signal in which a known unique word UW is inserted into a data signal to quasi-synchronous detection.

An output signal from sampler 701 is supplied to a data buffer 710 where it is stored, while also being supplied to DDD(N) 720 and DDD(N/2) 730 with different numbers of delay symbols.

DDD(N) 720 finds crosscorrelation between an N-symbol complex conjugate delay detection signal of the quasi-synchronous detection signal and an N-symbol complex conjugate delay detection signal of the unique word UW, and then outputs a crosscorrelation signal to a unique word detector (to be hereafter referred to as a UW detector) 721 and a unique word phase operator (to be hereafter referred to as a UW phase operator) 722.

DDD(N/2) 730 finds crosscorrelation between an N/2 symbol complex conjugate delay detection signal of the quasi-synchronous detection signal and an N/2 symbol complex conjugate delay detection signal of the unique word UW, and then outputs a crosscorrelation signal to a UW phase operator 731.

UW detector 721 compares the electric power value of the crosscorrelation signal with a predetermined threshold Sth1'. If the power value of the crosscorrelation signal exceeds the threshold Sth1', UW detector 721 outputs an IA-mode UW detection signal to data buffer 710.

Upon reception of the IA-mode UW detection signal, data buffer 710 outputs the output signal from sample 701 that has been stored, to a multiplier 711.

In UW phase operator 722, frequency offset information is obtained based on the crosscorrelation signals supplied from DDD(N) 720, and the information is fed to a phase combiner 723.

In UW phase operator 731, frequency offset information is obtained based on the crosscorrelation signals supplied from DDD(N/2) 730, and the information is fed to phase combiner 723.

In phase combiner 723, phases are combined based on the frequency offset information from UW phase operators 722 and 731, thereby generating frequency offset information concerning the carrier of the quasi-synchronous detection signal, namely IA-mode frequency offset information, which is then fed to a numerical control transmitter ("NCO") 724.

NCO 724 generates a frequency correction signal based on the frequency offset information that has been phase-combined in phase combiner 723.

Multiplier 711 generates a quasi-synchronous detection signal by multiplying the quasi-synchronous detection signal from data buffer 710 and the frequency correction signal from NCO 724, the quasi-synchronous detection signal having its frequency offset reduced to substantially zero. The thus generated quasi-synchronous detection signal is fed to a matched filer 712 as a second quasi-synchronous detection signal. Matched filter 712 reduces the noise or adjacent channel interfering components included in the quasi-synchronous detection signal.

The quasi-synchronous detection signal outputted from matched filter 712 is delivered to a DDD(4N) 740 with 4 N delay symbols. DDD(4N) 740 produces a crosscorrelation signal, which is fed to a UW detector 741.

In UW detector 741, the electric power value of the crosscorrelation signal and a threshold value Sth2' are compared, and if the electric power value of the crosscorrelation signal exceeds the threshold Sth2', UW detector 741 outputs a FA-mode UW detection signal.

The quasi-synchronous detection signal outputted from matched filter 712 is retained in data buffer 713 until the FA-mode UW detection signal is outputted from UW detector 741.

Upon reception of the FA-mode UW detection signal from UW detector 741, data buffer 713 outputs the quasi-synchronous detection signal stored in data buffer 713, which has been received from matched filter 712, to a multiplier 750.

Multiplier 750 multiplies the output signal from data buffer 713 with the output from NCO 751, and outputs a data signal.

A clock regenerator (CR) 752 regenerates the clock from the output of multiplier 750 and feeds it to NCO 751. Upon reception of the output from multiplier 750, a symbol timing regenerator (STR) 753 outputs the symbol timing to sampling signal generator 702.

Hereafter, the operation of signal detection circuit 700 will be described.

In order to detect the position of the unique word UW accurately and to extend the range of measurement while maintaining the frequency offset measurement accuracy, this scheme, which is based on the above-described unique word delay detection circuit (DDD) 600 of FIG. 15, has an operation state called an initial acquisition mode ("IA mode"), in which DDD(N) 720 and DDD(N/2) 730 with different numbers of delay symbols are provided.

FIG. 17 shows a flowchart of a series of processes that are performed for the detection of the unique word UW in signal detection circuit 700.

The IA-mode unique word delay detection circuit used in the IA mode comprises unique word delay detection circuit (DDD(N)) 720 with the number of delay symbols N (where $0.5<N\leq 1$) and unique word delay detection circuit (DDD(N/2)) 730 with the number of delay symbols N/2.

In the IA-mode unique word delay detection circuit, a first and a second crosscorrelation signal are generated by DDD(N) 720 and DDD(N/2) 730 on the basis of the first quasi-synchronous detection signal, which has been obtained by subjecting the orthogonal modulated signal having a known unique word UW inserted into the data signal to quasi-synchronous detection (step S701).

If the electric power value of the first crosscorrelation signal outputted from DDD(N) 720 exceeds the first threshold value Sth1', UW detector 721 generates an IA-mode UW detection signal indicating the detection of the unique word UW from the supplied first quasi-synchronous detection signal. Meanwhile, in response to the first and second crosscorrelation signals from DDD(N) 720 and DDD(N/2) 730, phase combiner 723 generates IA-mode frequency offset information indicating a frequency offset $F_0$ of the first quasi-synchronous detection signal (step S702).

In signal detection circuit 700, in order to prevent false UW detection, the FA-mode UW delay detection circuit operates in the fine-tuning acquisition mode following the detection (step S702) of the aforementioned unique word UW in the IA mode.

The FA-mode UW delay detection circuit comprises a UW delay detection circuit (DDD(N/4)) 740 with the number of delay symbols 4N for use in the FA mode.

The FA-mode UW delay detection circuit multiplies the outputs of the IA-mode unique word delay detection circuit, namely the first quasi-synchronous detection signal (output from data buffer 710) with the frequency correction signal (output from NCO 724), which responds to the IA-mode frequency offset information, thereby producing the second quasi-synchronous detection signal, in which the frequency offset is reduced to substantially zero. The second quasi-synchronous detection signal is fed to matched filter 712 in which noise or adjacent channel interference is reduced (step S703) and onto DDD(4N) 740, which outputs the FA-mode crosscorrelation signal (step S704).

In response to the crosscorrelation signal outputted from DDD(4N) 740, if the electric power value of the FA-mode crosscorrelation signal exceeds the second threshold Sth2', the FA-mode UW delay detection circuit generates the FA-mode UW detection signal indicating the detection of the unique word UW from the second quasi-synchronous detection signal that corresponds to the first quasi-synchronous detection signal (step S705).

Upon the generation of the above FA-mode UW detection signal (step S705), signal detection circuit 700 ends the UW detection operation and enters a steady mode ("SS mode"), where the detection circuit operates as a demodulation circuit in which the second quasi-synchronous detection signal is subjected to synchronous detection and the data signal is demodulated (step S706).

In bi-directional communications, however, there are cases where the received signal is demodulated and a signal must be transmitted based on the information obtained from the received signal.

When the time between the reception of a signal and the start of transmission is defined, such as in this case, it is necessary to start the demodulation process as soon as possible.

Thus, in the case of the conventional OFDM demodulation circuit 400 as described above, if the preamble signal is detected erroneously, it is impossible to detect the error until the demodulation process is complete and an error detection is performed. Therefore, the demodulation process cannot be terminated, which may result in a failure to detect the original signal while the erroneous signal is being demodulated.

In the case of the conventional signal detection circuit 700, which was described subsequently, it is only after the received signal is subjected to delayed detection, its result is further subjected to delayed detection once again, and the result is outputted that the demodulation process is initiated. Thus, it takes a great deal of time before the demodulation process can be initiated after the reception of a signal.

Further, this signal detection circuit is not provided with a means to terminate the demodulation process in case an erroneous signal detection occurs.

In view of the aforementioned problems, it is the object of the invention to provide an OFDM demodulation circuit in which a demodulation process is initiated within a short period of time after the reception of a signal, and in which, in case the demodulation process is initiated erroneously, the demodulation process can be terminated as soon as possible. The invention also aims to provide an OFDM reception apparatus utilizing the OFDM demodulation circuit.

SUMMARY OF THE INVENTION

The invention provides an OFDM demodulation circuit that receives and demodulates an OFDM signal comprising a plurality of orthogonal carrier signals. The circuit comprises analysis means for analyzing the OFDM signal prior to demodulation, and demodulation process terminating means for terminating the demodulation of the OFDM received signal in accordance with the result of analysis by the analysis means.

The analysis means of the OFDM demodulation circuit comprises correlation means for determining a correlation value between the OFDM received signal prior to demodulation and a signal obtained by delaying the received signal prior to demodulation, and peak detection means for detecting a peak position of a correlation value for starting a demodulation process and a peak position of a correlation value for continuing the demodulation process.

The analysis means of the OFDM demodulation circuit of the invention comprises correlation means for determining a correlation value between the OFDM received signal prior to demodulation and a signal sequence that is prepared in advance in accordance with the OFDM scheme of interest, and peak detection means for detecting, on the basis of the correlation value obtained by the correlation means, a peak position of a correlation value for starting a demodulation process and a peak position of a correlation value for continuing the demodulation process.

Further, the correlation means of the OFDM demodulation circuit of the invention is adapted such that the OFDM received signal prior to demodulation is delayed by a delay time that is shorter than a window time Tw that is used for the demodulation of the OFDM received signal.

Further, the peak detection means of the OFDM demodulation circuit of the invention is adapted such that Sth1<Sth2, where Sth1 is a detection threshold value of the peak position of the correlation value for starting the demodulation process, and Sth2 is a detection value of the peak position of the correlation value for continuing the demodulation process.

The peak detection means of the OFDM demodulation circuit of the invention is further adapted such that $T_1 < T_2$, where $T_1$ is an analysis time for the peak position of the correlation value for starting the demodulation process, and $T_2$ is an analysis time for the peak position of the correlation value for continuing the demodulation process.

The demodulation process terminating means of the OFDM demodulation circuit of the invention terminates the demodulation of the OFDM received signal if the peak position of the correlation value for continuing the demodulation process is not detected by the peak detection means within a predetermined period of time following the detection by the peak detection means of the peak position of the correlation value for starting the demodulation process.

Further, the OFDM reception apparatus of the invention comprises an OFDM demodulation circuit having the above-described features.

On account of these features, the OFDM demodulation circuit and OFDM reception apparatus according to the invention are capable of reducing the period for the observation (analysis period) of the OFDM received signal and starting a demodulation process early.

BEST MODE OF CARRYING OUT THE INVENTION

Figure 1:
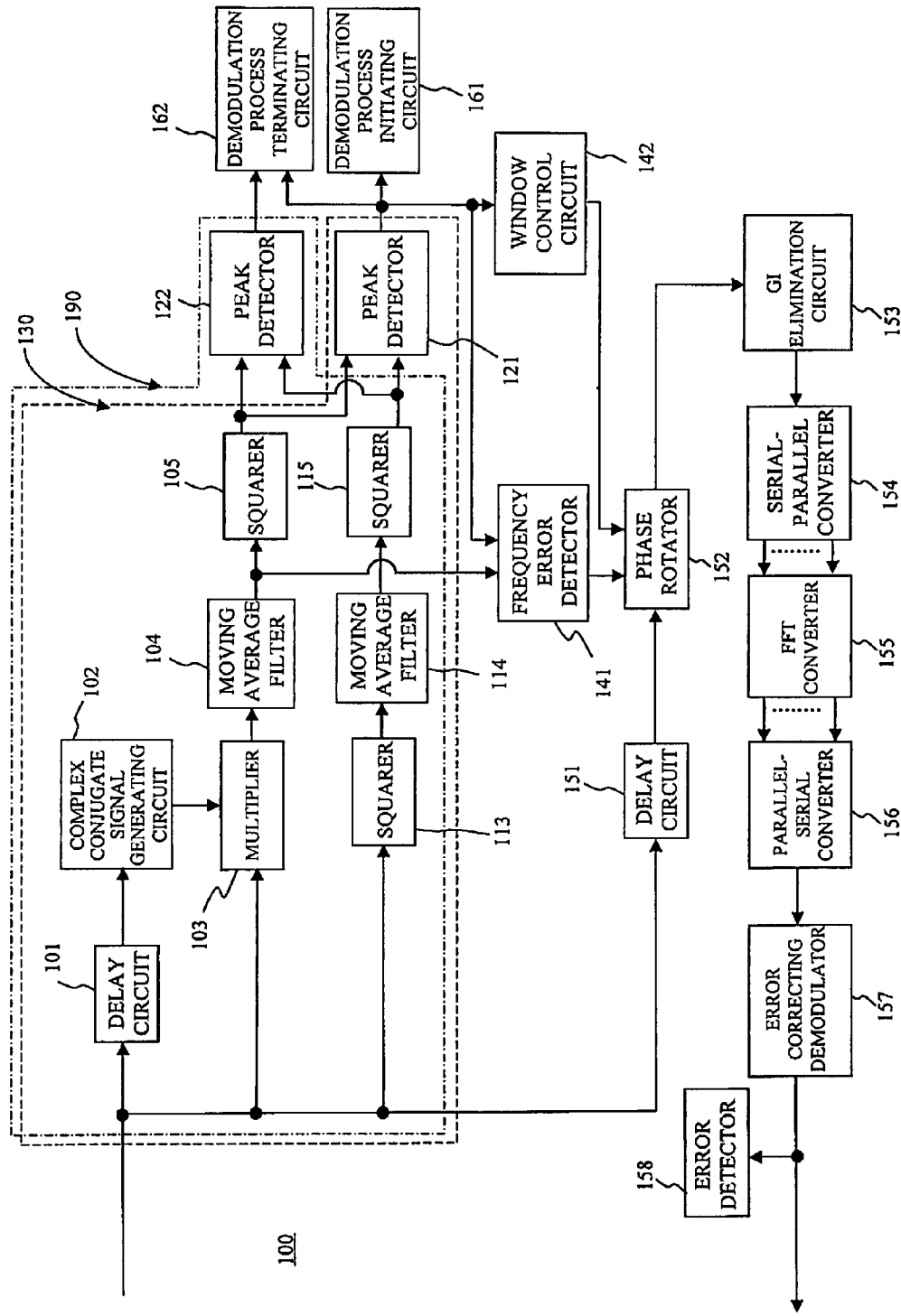
FIG. 1 shows a block diagram of the OFDM demodulation circuit according to an embodiment of the invention.

Preferred embodiments of the invention will be described by referring to the drawings.

FIG. 1 shows a block diagram of the OFDM demodulation circuit according to an embodiment of the invention.

In the following description of OFDM demodulation circuit 100 of the present embodiment, structures similar to those of the conventional OFDM demodulation circuit 500 will be referred to by identical reference numerals as far as the last two digits of the numerals are concerned.

Figure 2:
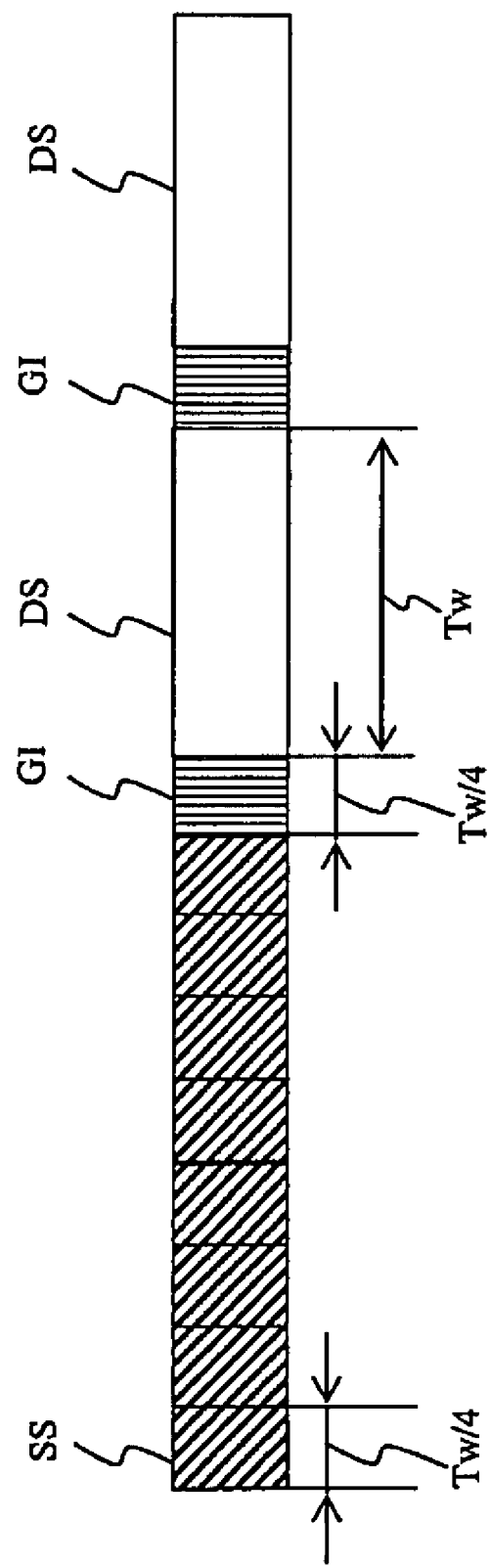
FIG. 2 shows an example of the format of a packet in the OFDM demodulation circuit of the embodiment.

FIG. 2 shows an example of the format of a packet in the OFDM demodulation circuit of the present embodiment.

In the present embodiment too, a preamble signal is attached at the start of the frame of packet P of an OFDM received signal, which corresponds to the OFDM modulated signal, the preamble being used for the detection of a carrier frequency error and symbol detection, for example, as shown in FIG. 2. The preamble signal is formed by a repetition of eight start symbols SS that are known, each with a length of interval Tw/4 on the time axis.

After these eight start symbols SS as preamble signals are disposed at the beginning of packet P, a guard interval GI and a data symbol DS are repeatedly arranged.

The thus structured OFDM received signal is fed to a delay circuit 101, multiplier 103, squarer 113 and delay circuit 151 in OFDM demodulation circuit 100.

In this delay circuit 101, the OFDM received signal is delayed by time Tw/4.

Time Tw refers to the width of an IFFT (Inverse Fast Fourier Transform) window and that of an FFT (Fast Fourier Transform) window, which are used in the demodulation and modulation of the OFDM signal.

An output signal from delay circuit 101 is fed to a complex conjugate signal generating circuit 102.

A complex conjugate signal generated in complex conjugate signal generating circuit 102 is complex-multiplied with the current OFDM received signal in multiplier 103, whereby a crosscorrelation value between these signals is calculated. An output signal from multiplier 103 is fed to a moving average filter 104.

In moving average filter 104, the output from multiplier 103 is subjected to moving average calculation to calculate an average over time 7×Tw/4 in the case of the present embodiment. An output signal from moving average filter 104 is fed to squarer 105 in which the signal is converted into an electric power signal, which is then fed to peak detectors 121 and 122.

The OFDM received signal inputted to squarer 113 is squared therein to produce an autocorrelation value, which is fed to moving average filter 114.

In moving average filter 114, the output of squarer 113 is moving-averaged to calculate an average over time 7×Tw/4, as with moving average filter 104. An output signal from moving average filter 114 is fed to squarer 115 where it is converted into an electric power signal, which is then fed to peak detectors 121 and 122.

Peak detector 121 divides the output signal from squaring circuit 105 by the output signal from squaring circuit 115. If the magnitude of the divided signal exceeds a predetermined threshold Sth1, peak detector 121 outputs a symbol timing signal for initiating the demodulation process to a demodulation process start circuit 161, a demodulation process terminating circuit 162, a carrier frequency error detection circuit 141 and an FFT window control circuit 142.

Based on the input of the symbol timing signal from peak detector 121, it is determined that a packet of the OFDM received signal has been received, and demodulation process start circuit 161 initiates a demodulation process, while carrier frequency error detection circuit 141 detects a carrier frequency error from the output signal from moving average filter 104 and then outputs the error to a phase rotator 152. FFT window control circuit 142 initiates a window timing control and outputs a control signal to phase rotator 152.

Thus, it can be considered that a symbol timing detector 130 is constituted by the aforementioned delay circuit 101, complex conjugate signal generating circuit 102, multiplier 103, moving average filter 104, squarers 105 and 113, moving average filter 114, squarer 115, and peak detector 121.

On the other hand, delay circuit 151 delays the OFDM received signal and outputs the delayed OFDM received signal to phase rotator 152, while the above-described signal processing is performed by the above-described symbol timing detector 130, frequency error detector 141, and FFT window control circuit 142.

Thus, after the output of the symbol timing signal from symbol timing signal detector 130, the OFDM received signal outputted from delay circuit 151 has its frequency offset compensated for in phase rotator 152 in the same manner as in the case of the above-described OFDM demodulation circuit 500, and then the attached guard interval GI is removed in guard interval eliminating circuit 153. Then, the output of guard interval eliminating circuit 153 is rendered by serial-parallel converter 154 back into an information signal that is code-modulated for each sub-carrier. The output of serial-parallel converter 154 is further demodulated in an FFT converter 155 from a time-domain signal into a frequency-domain signal, which is then converted in parallel-serial converter 156 into serial data, namely a coded-modulated information signal. The signal is then subjected to error correcting demodulation in an error correcting demodulator 157, thereby demodulating the signal into the input information signal, which is then outputted.

Figure 12:
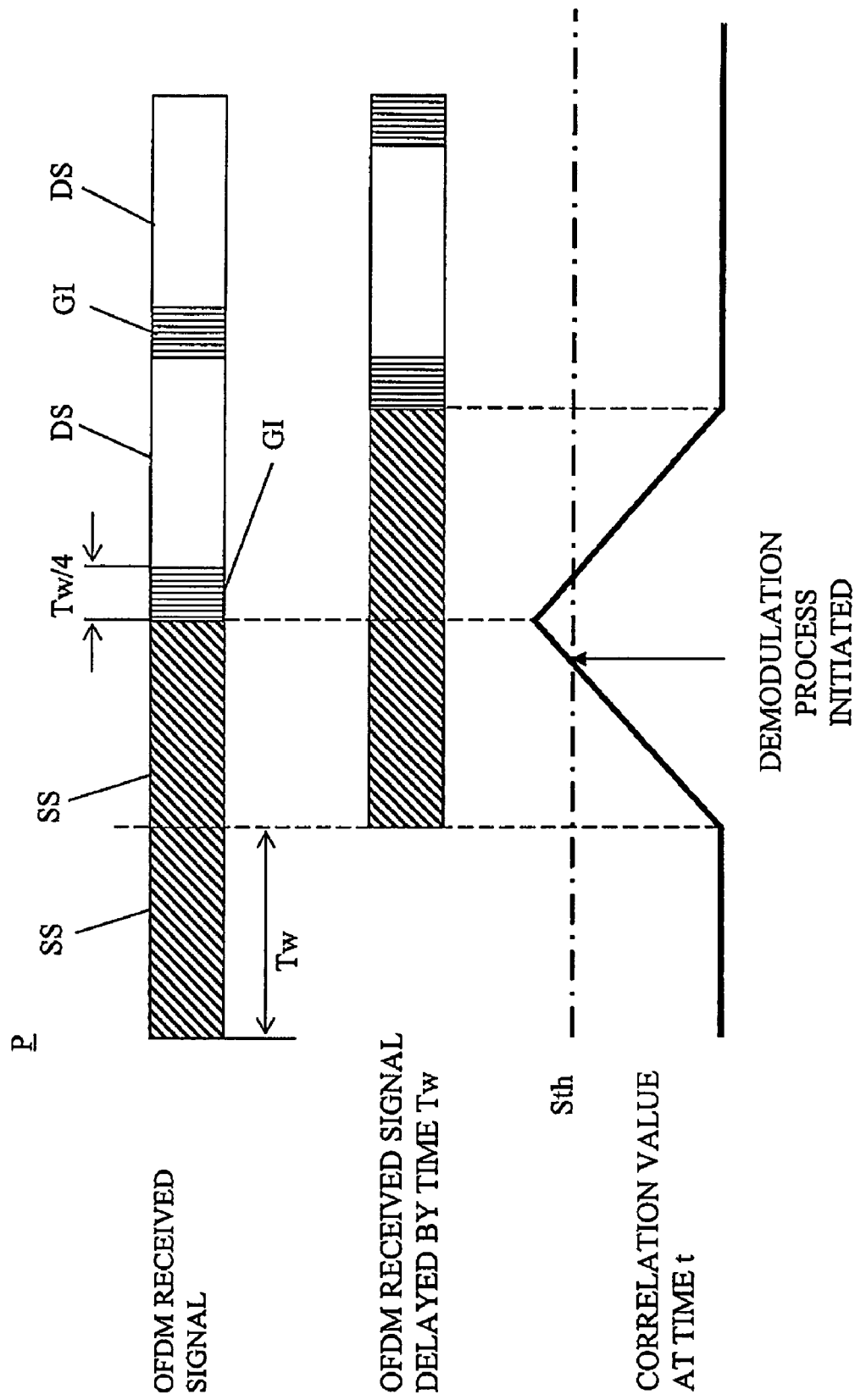
FIG. 12 shows the temporal changes in the magnitude of the correlation value between the OFDM received signal and the OFDM received signal delayed by time Tw, as the OFDM received signal and the OFDM received signal are fed to moving average filters 404 and 414.
Figure 13:
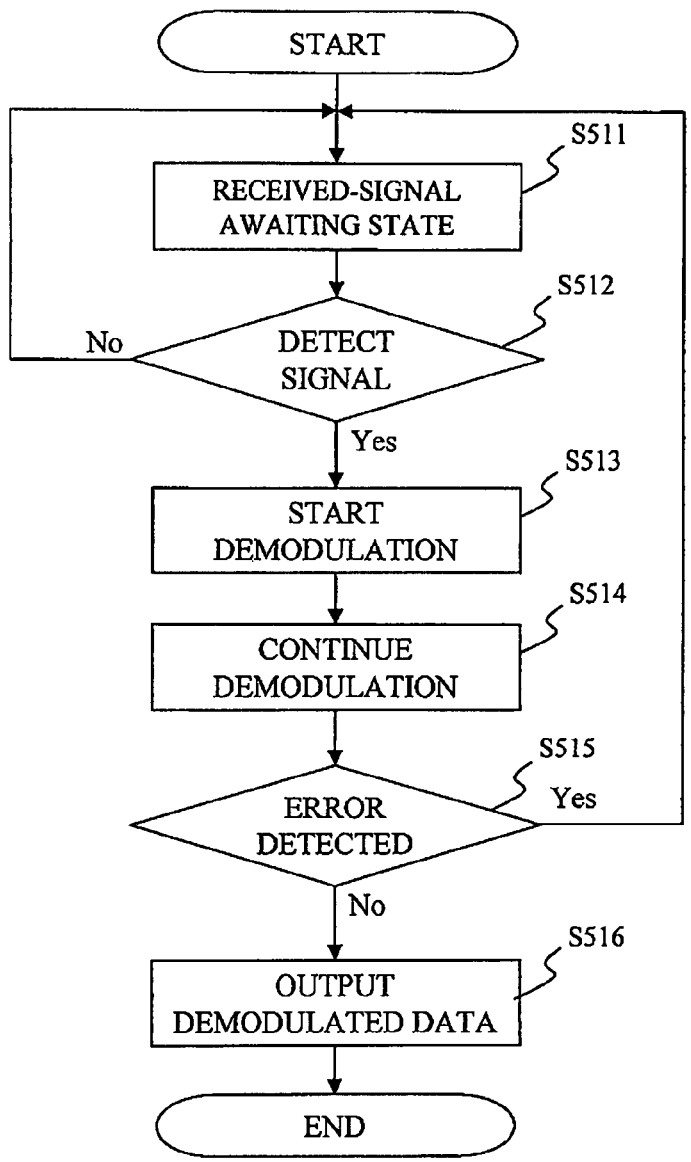
FIG. 13 shows a flowchart of the operation of the conventional OFDM demodulation circuit.
Figure 14:
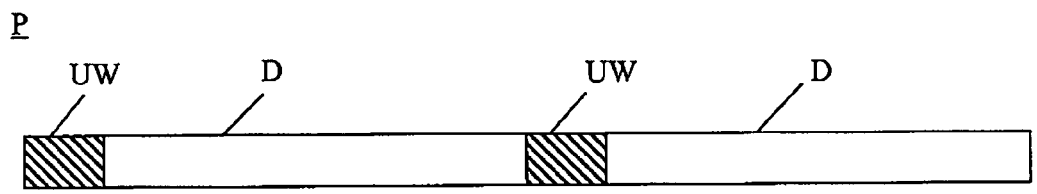
FIG. 14 shows an example of the frame format of a packet used in an OFDM demodulation circuit of the unique word delay detection scheme.
Figure 15:
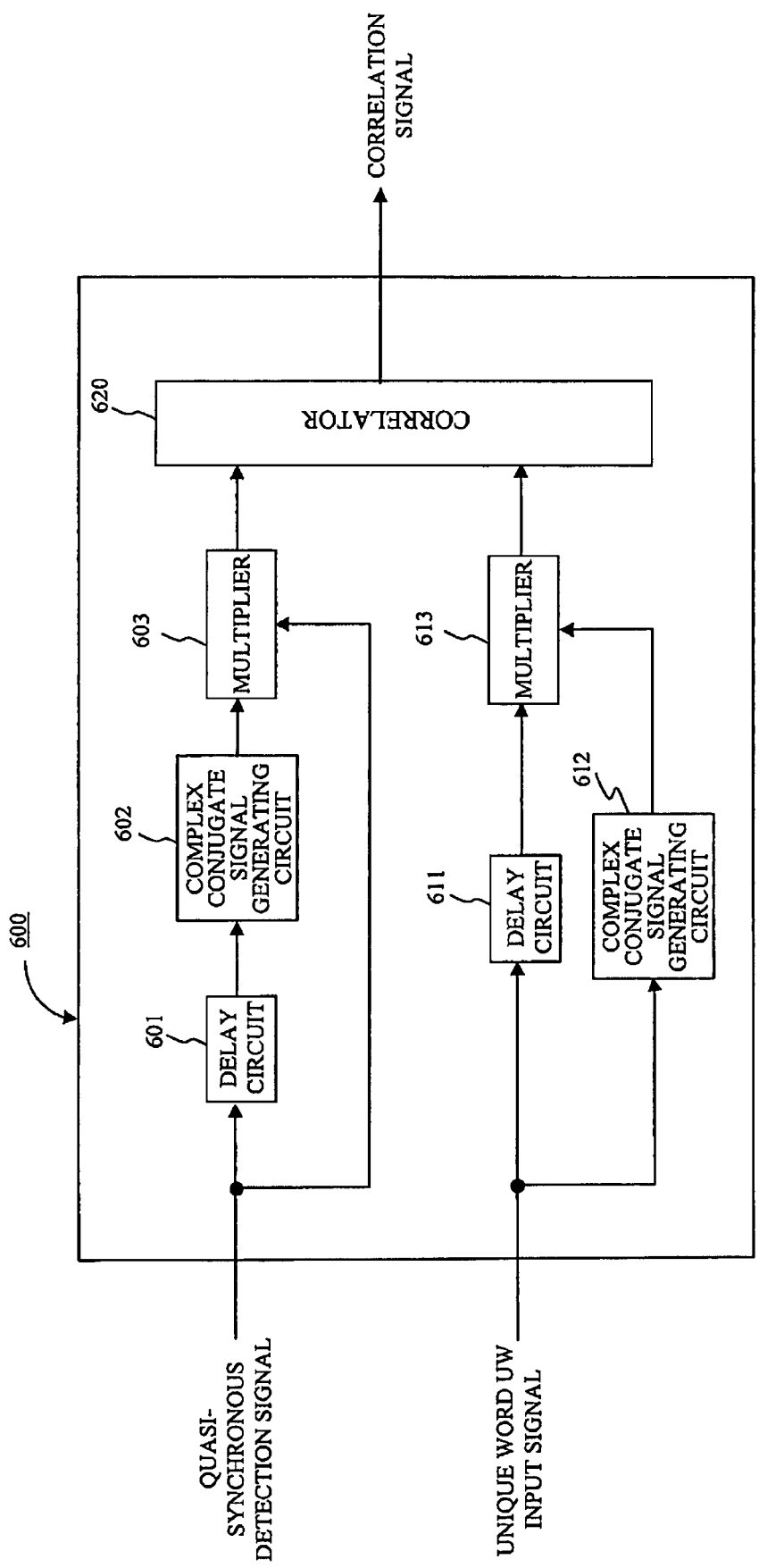
FIG. 15 shows a block diagram of a unique word delay detection circuit applied to the OFDM demodulation circuit.
Figure 16:
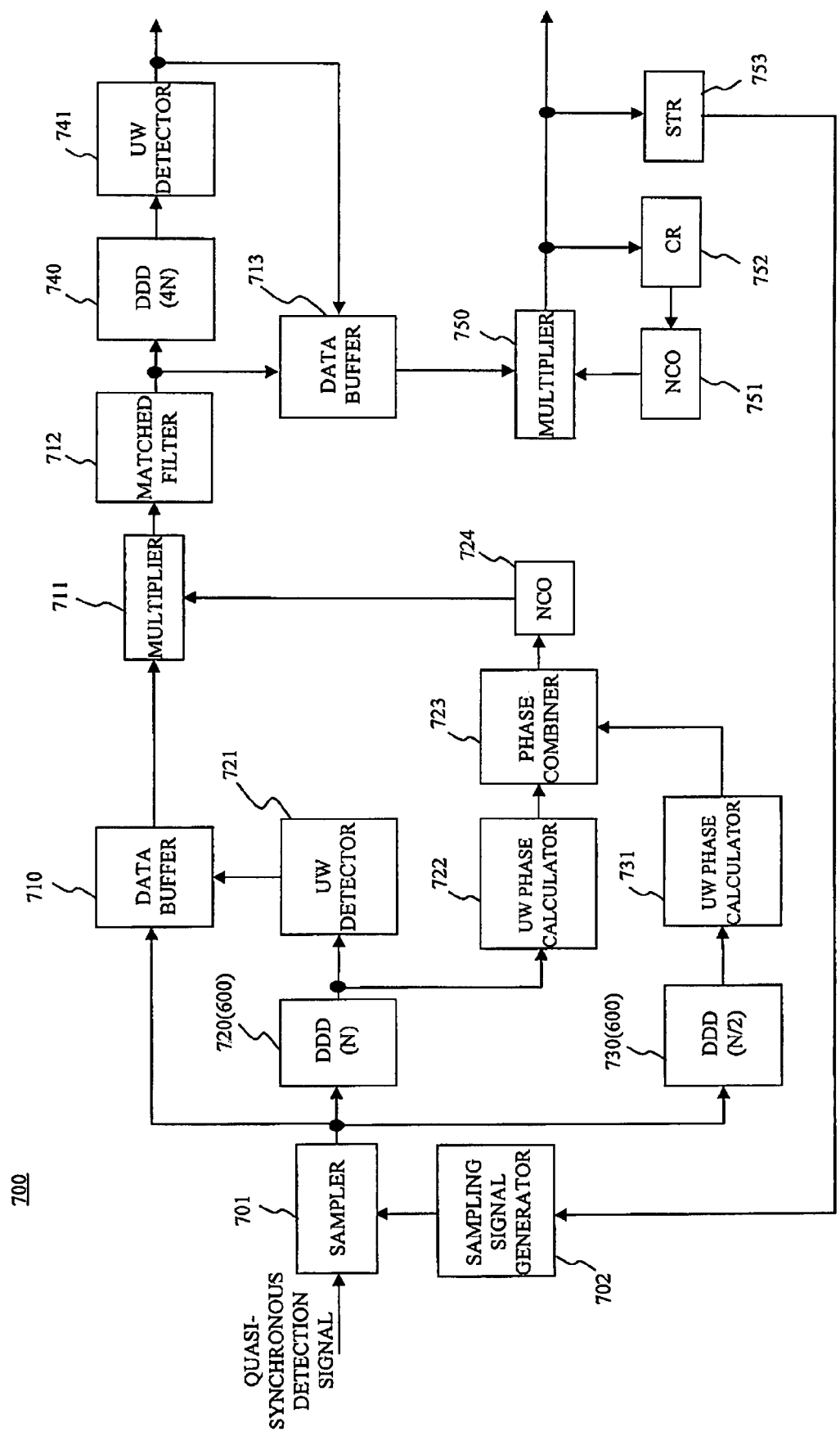
FIG. 16 shows a block diagram of a conventional signal detection circuit to which the UW delay detection circuit of FIG. 15 is applied.
Figure 17:
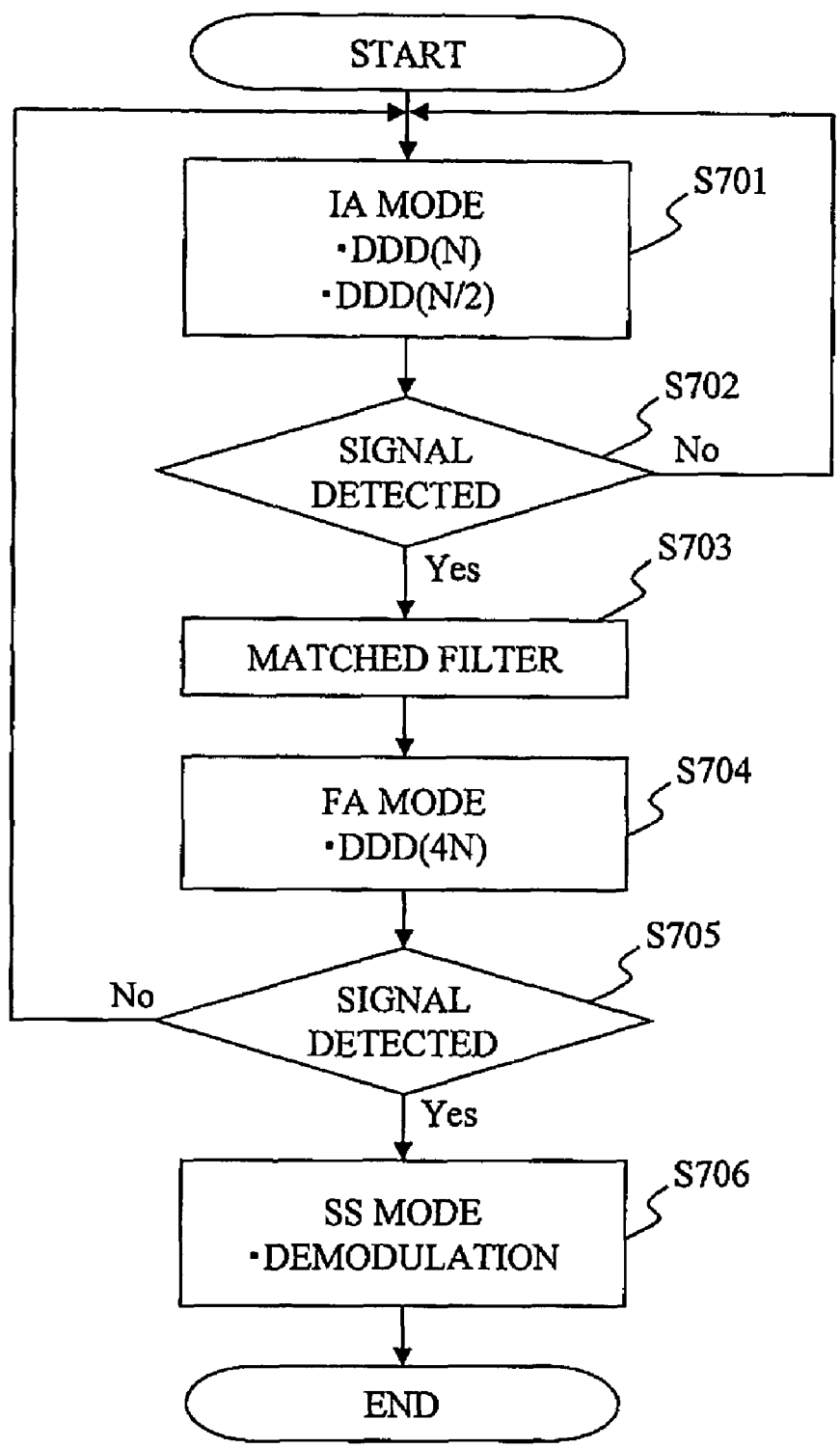
FIG. 17 shows a flowchart of a series of processes for the detection of a unique word UW in the OFDM demodulation circuit.

The predetermined threshold Sth1 that is set in advance in peak detector 121 in symbol timing signal detector 130, which outputs a symbol timing signal for activating demodulation start circuit 161, i.e., for initiating the demodulation process in OFDM demodulation circuit 100, is set at a value lower than the threshold value Sth (see FIG. 12) in the case of a single start symbol SS with length of interval Tw on the time axis according to the prior art. This is due to the fact that the length of interval of a single start symbol SS on the time axis in the preamble signal of the OFDM received signal is reduced to ¼ the width Tw of the window of IFFT converter 403 (see FIG. 10) in the aforementioned OFDM modulation circuit 400 and the width Tw of FFT modulator 155.

Thus, in OFDM demodulation circuit 100 of the present embodiment, the time between the reception of the OFDM received signal and the start of demodulation can be made shorter than the width Tw of the window of IFFT converter 403 (see FIG. 10) and the width Tw of FFT converter 155, or down to approximately Tw/4 to be more specific.

On the other hand, in OFDM demodulation circuit 100 of the present embodiment, there is provided peak detector 122 separate from the aforementioned peak detector 121.

Peak detector 122 divides the output signal from squaring circuit 105 by the output signal from squaring circuit 115. If the magnitude of the signal obtained by division exceeds a preset threshold value Sth2, peak detector 122 outputs a symbol timing signal to demodulation terminating circuit 162, the symbol timing signal causing the demodulation process to go on.

Thus, it can be considered that a symbol timing signal analyzer 190 is constituted by delay circuit 101, complex conjugate generating circuit 102, multiplier 103, moving average filter 104, squarer 105, squarer 113, moving average filter 114, squarer 115, and peak detector 122.

Threshold Sth2 in peak detector 122 is set to be higher than threshold Sth1 in peak detector 121, which is set to be low so as to cause the demodulation process to start early. This is for the purpose of preventing the influences of noise or adjacent channel interference.

In the present embodiment, threshold Sth2 in peak detector 122 can be set to be significantly higher than threshold value Sth1 because, as opposed to the fact that the length of interval of a single start symbol SS in the preamble signal of the OFDM received signal on the time axis is Tw/4 and therefore the time between the reception of the OFDM received signal and the start of demodulation can be reduced to approximately Tw/4, the time for average calculations in moving average filters 104 and 114 can be acquired up to approximately 7×Tw/4. Thus, the influence of noise or adjacent channel interference can be more easily avoided.

Upon reception of the symbol timing signal from peak detector 121, demodulation process terminating circuit 162, determining that the above-described demodulation process has been started, starts counting a preset time T, while monitoring to see whether or not the symbol timing signal is inputted from peak detector 122 during the counting of predetermined time T.

If the symbol timing signal is inputted from peak detector 122 during the counting of predetermined time T, demodulation process terminating circuit 162, determining that the position at which the demodulation process has been started, namely the timing at which the symbol timing signal was outputted from peak detector 121, is correct, causes the demodulation process to continue.

If, on the other hand, no timing signal is inputted from peak detector 122 during the counting of predetermined time T, demodulation process terminating circuit 162, determining that the position at which the demodulation process has been started, namely the timing at which the symbol timing signal was outputted from peak detector 121, is wrong, outputs a demodulation process terminating signal when the counting of predetermined time T is completed.

Threshold value Sth1 in peak detector 121, threshold value Sth2 in peak detector 122, and predetermined time T in demodulation process terminating circuit 162 are set in accordance with the time for moving average filters 104 and 114 to perform averaging calculations, i.e., the analysis period.

Figure 3:
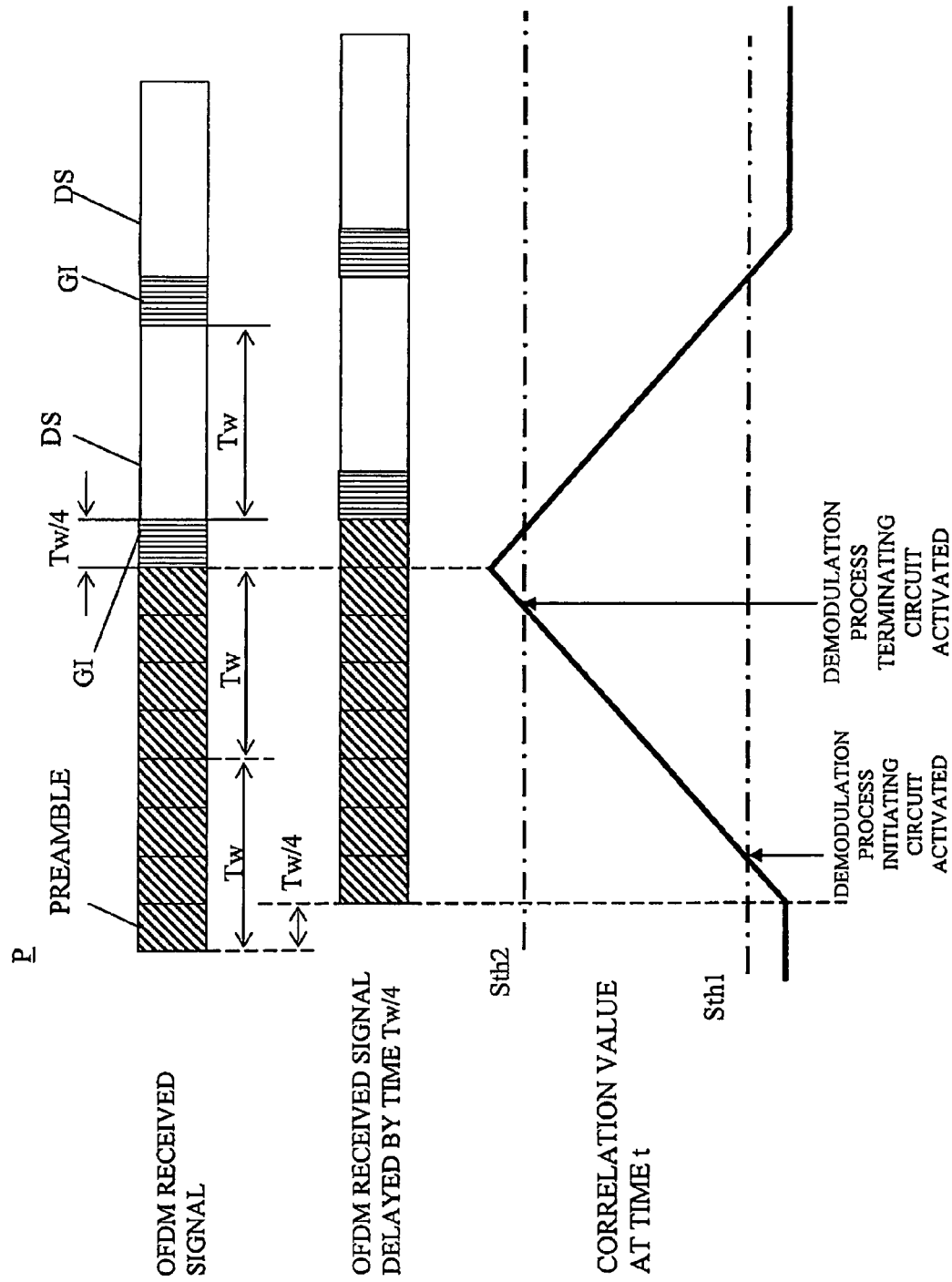
FIG. 3 shows the correlation value between an OFDM received signal and a signal obtained by delaying the OFDM received signal by a time Tw/4.

FIG. 3 shows correspondence values at time t between the OFDM received signal and the signal obtained by delaying the OFDM received signal by Tw/4.

Figure 4:
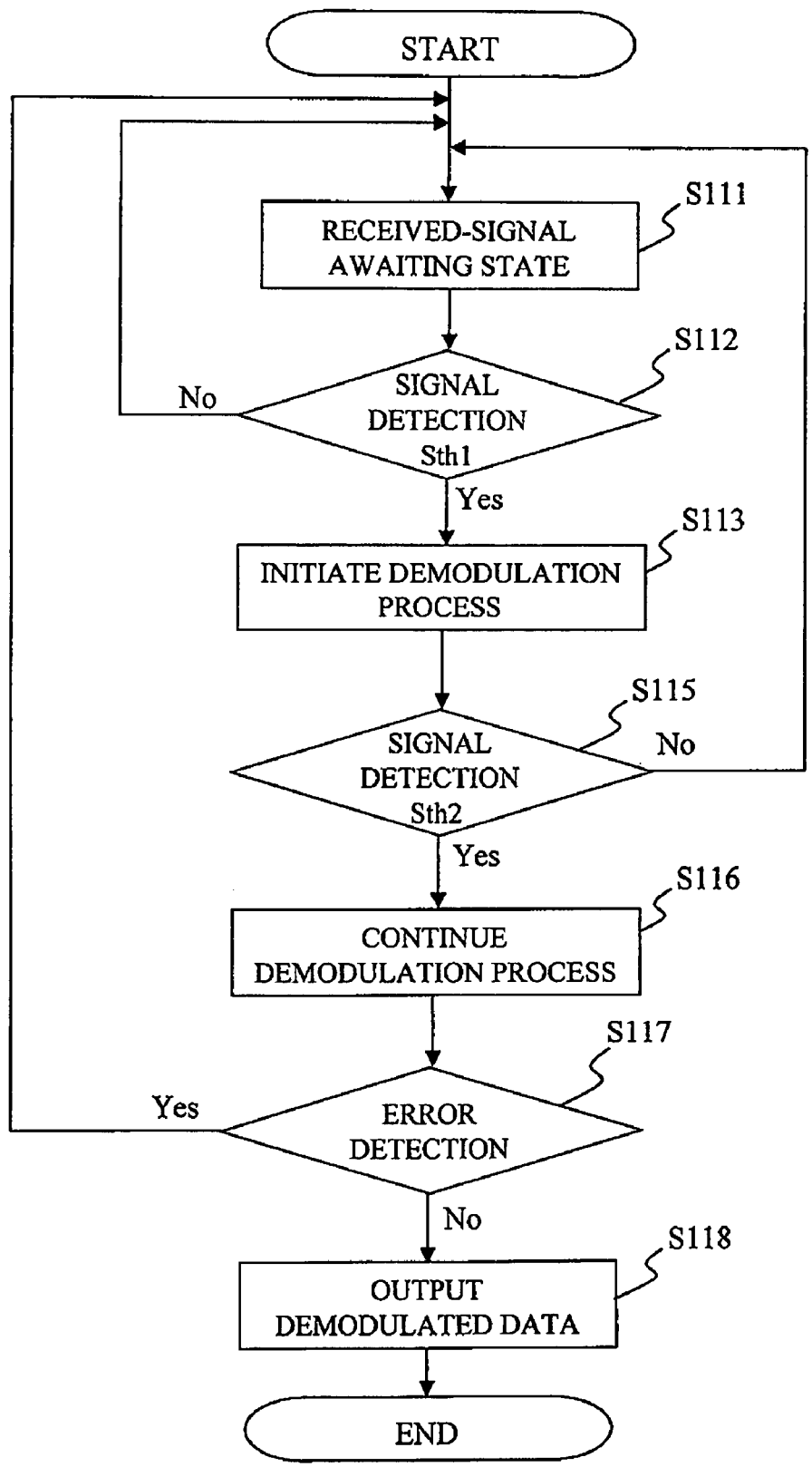
FIG. 4 shows a flowchart of the operation of the OFDM demodulation circuit of the embodiment of the invention.

FIG. 4 shows a flowchart of the operation of OFDM demodulation circuit 100.

Hereafter, the operation of OFDM demodulation circuit 100 will be described by referring to these drawings.

OFDM demodulation circuit 100 performs various calculations on the received signal (modulation baseband signal), such as delay calculations, moving average calculations, and correlation calculations, for detecting the symbol timing signal in the received-signal awaiting state (step S111). If, as a result of the peak detecting process, the correlation value between the OFDM received signal and the signal obtained by delaying the OFDM received signal by Tw/4 (i.e., the magnitude of the signal obtained by dividing the output signal from squaring circuit 105 by the output signal from squaring circuit 115) exceeds threshold Sth1 (step S112), this is detected by peak detector 121, which then outputs a symbol timing signal for initiating the demodulation to demodulation process initiating circuit 161, for example, whereby the demodulation process is started (step S113).

Demodulation process terminating circuit 162, to which the symbol timing signal is also supplied, starts counting predetermined time T upon reception of the symbol timing signal.

If the position at which the demodulation process was started is correct, the correlation value should exceed threshold Sth2 within predetermined time T.

Thus, if the correlation value exceeds threshold value Sth2 within predetermined time T, namely if the symbol timing signal for continuing demodulation is supplied from peak detector 122 to demodulation process terminating circuit 162 before predetermined time T is counted by demodulation process terminating circuit 162 (step S115), demodulation process terminating circuit 162 resets/stops the counting of predetermined time T, and causes the demodulation process to go on based on the symbol timing signal in step S112 (step S116). If no demodulation error is detected in the demodulated input information signal by error detector 158 (step S117), the output signal from error correcting demodulator 157 is outputted as the demodulated data (demodulated input information signal) (step S118).

On the other hand, if the correlation value did not exceed threshold value Sth2 within predetermined time T, namely if the symbol timing signal for continuing demodulation is not supplied from peak detector 122 to the demodulation process terminating circuit 162 (step S115) before demodulation process terminating circuit 162 completes the counting of predetermined time T, demodulation process terminating circuit 162, determining that the position at which the demodulation process was started was wrong, quickly terminates the currently executed demodulation process (the demodulation process that has been started in step S113) as soon as the counting of predetermined time T is completed, and then returns to the received-signal awaiting state (step S111).

As a result, threshold Sth1 of the correlation value for starting the demodulation process can be set to be low, and the demodulation process can be quickly started after the input of the OFDM received signal. Thus, the time between the reception of the OFDM received signal and the start of demodulation can be made smaller than the window width Tw of IFFT converter 403 (see FIG. 10) and FFT converter 155, namely it can be shortened to approximately Tw/4 in the case of the present embodiment.

Further, in case the demodulation process is initiated upon detection of noise or adjacent channel interference mistakenly for the OFDM received signal, the demodulation process that is being executed can be terminated by discovering the erroneous detection of the OFDM received signal. Thus, there is hardly any possibility of failing to detect the true OFDM received signal.

Figure 5:
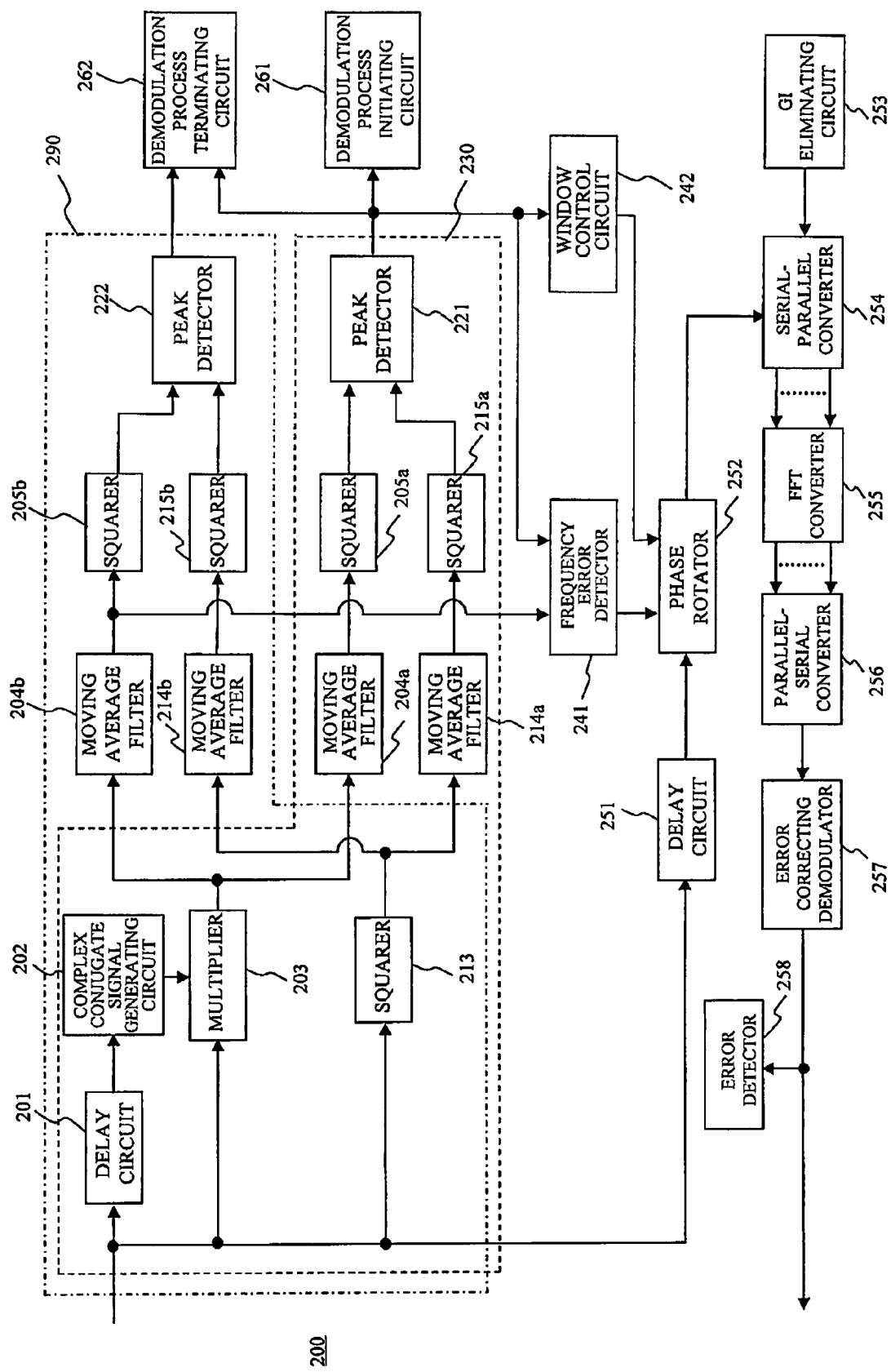
FIG. 5 shows a block diagram of the OFDM demodulation circuit according to another embodiment of the invention.

FIG. 5 shows a block diagram of the OFDM demodulation circuit according to another embodiment of the invention.

In OFDM demodulation circuit 100 of the previous embodiment, the analysis time required for the output of the symbol timing signal for starting demodulation and the analysis time for the output of the symbol timing signal for continuing demodulation are the same (7×Tw/4) due to the common use of moving average filters 104 and 105. In OFDM demodulation circuit 200 of the present embodiment, however, the analysis time (Tw/4) for the output of the symbol timing signal for initiating demodulation is different from the analysis time (7×Tw/4) for the output of the symbol timing signal for continuing demodulation.

Accordingly, the format of a packet of the OFDM signal used in OFDM demodulation circuit 200 is as shown in FIG. 2, which is the same as that for the above-described OFDM demodulation circuit 100.

In the following description of OFDM demodulation circuit 200 of the present embodiment, portions similar to those of OFDM demodulation circuit 100 are designated with identical numerals as far as the last two digits of the numerals are concerned, and they are therefore not described any more.

In OFDM demodulation circuit 200 of the present embodiment, the signal output from a multiplier 203 is supplied to moving average filters 204a and 204b. The signal output from a squarer 213 is supplied to a moving average filters 214a and 214b. Squarers 205a, 205b, 215a and 215b are provided at the outputs of moving average filters 204a, 204b, 214a and 214b, respectively.

Moving average filters 204a and 214a have the period (analysis period) Tw/4 in which the signal is retained, while the analysis period for moving average filters 204b and 214b is 7×Tw/4.

Thus, it can be considered that a symbol timing signal detector 230 is constituted by the aforementioned delay circuit 201, crosscorrelation signal generating circuit 202, multiplier 203, moving average filter 204a, squarer 205a, squarer 213, moving average filter 214a, squarer 215a and peak detector 221. It can also be considered that a symbol timing signal analyzer 290 is constituted by the aforementioned delay circuit 201, crosscorrelation signal generating circuit 202, multiplier 203, moving average filter 204b, squarer 205b, squarer 213, moving average filter 214b, squarer 215b and peak detector 222.

Figure 6:
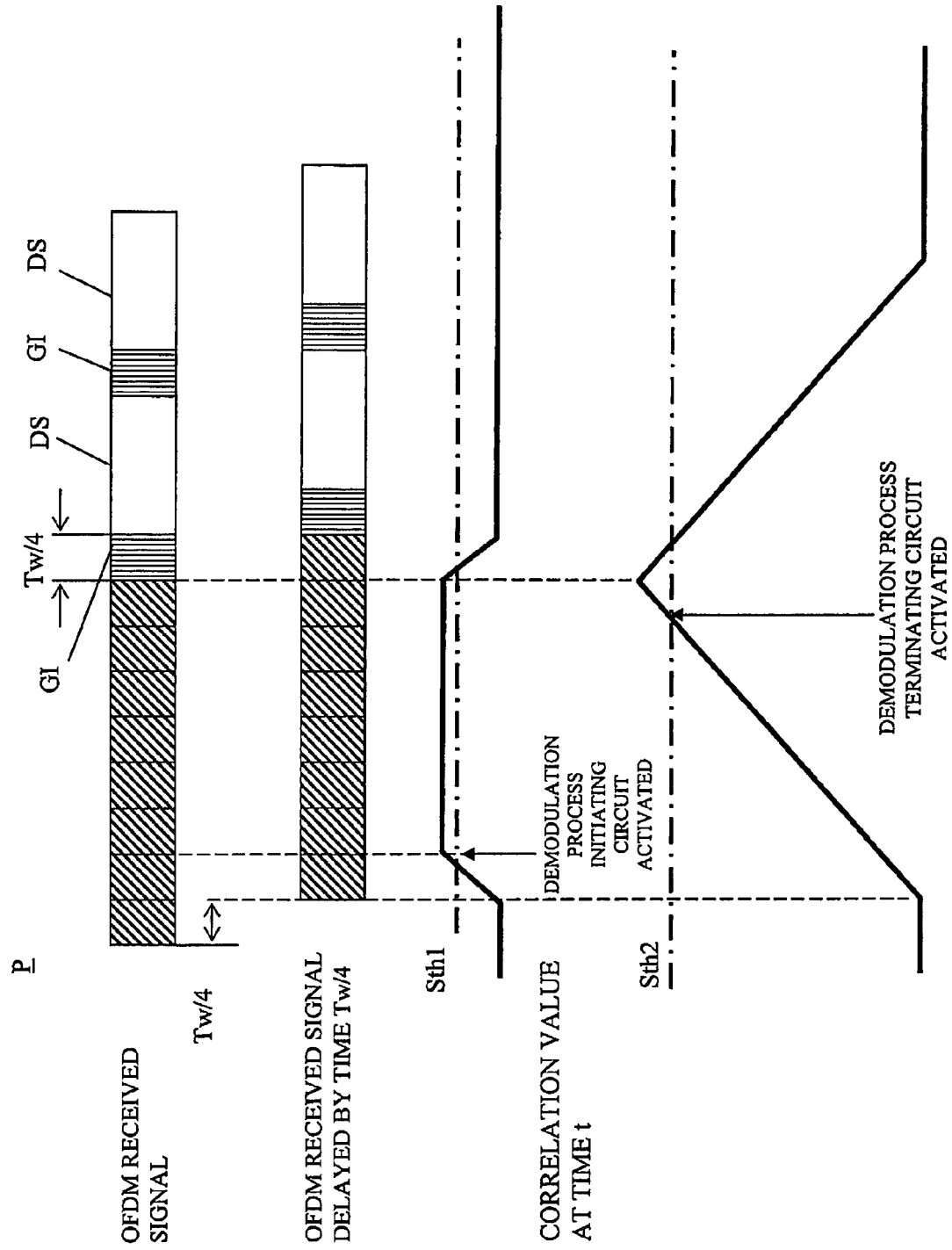
FIG. 6 shows the correlation values between the OFDM received signal and a signal obtained by delaying the OFDM received signal by time Tw/4, in the case of moving average filters 204a and 214a with an analysis period of Tw/4 and in the case of moving average filters 204b and 214b with an analysis period of 7×Tw/4.

FIG. 6 shows the correlation value at time t between the OFDM received signal and the signal obtained by delaying the OFDM received signal by time Tw/4, in the case of the analysis period Tw/4 in moving average filters 204a and 214a, and in the case of the analysis period 7×Tw/4 in moving average filters 204b and 214b.

In OFDM demodulation circuit 200 of the present embodiment, since the analysis period is Tw/4, the peak value of the correlation value obtained by peak detector 221 is smaller than the peak value of the correlation value obtained by peak detector 121 in OFDM demodulation circuit 100, in which the analysis period is 7×Tw/4.

Nevertheless, there is less noise components in the correlation value due to the shorter analysis period, so that signal detection can be performed more accurately than possible in demodulation process initiating circuit 161 in the above-described OFDM demodulation circuit 100.

The operation of OFDM demodulation circuit 200 is similar to that of OFDM demodulation circuit 100 and is therefore not described herein.

The circuitry of OFDM demodulation circuit 200 of the present embodiment is slightly more complicated than that of the above-described OFDM demodulation circuit 100. However, in OFDM demodulation circuit 100, peak detector 121 detects the peak value from the signal (the output of squarers 105 and 115, to which the output of moving average filters 104 and 114, respectively, with the moving averaging time of 7×Tw/4 is fed) obtained after monitoring with a long analysis period, using threshold value Sth1, which is low. As a result, in OFDM demodulation circuit 100, more noise components are collected, thereby increasing the possibility of erroneously detecting a peak value. On the other hand, in OFDM demodulation circuit 200 of the present embodiment, it is only necessary for peak detector 221 to monitor signals (the outputs of squarers 205a and 215a, to which the output of moving average filters 204a and 214a, respectively, with the moving averaging time of Tw/4 is fed) for a shorter period of time, so that the possibility of erroneous detection is lowered.

Figure 7:
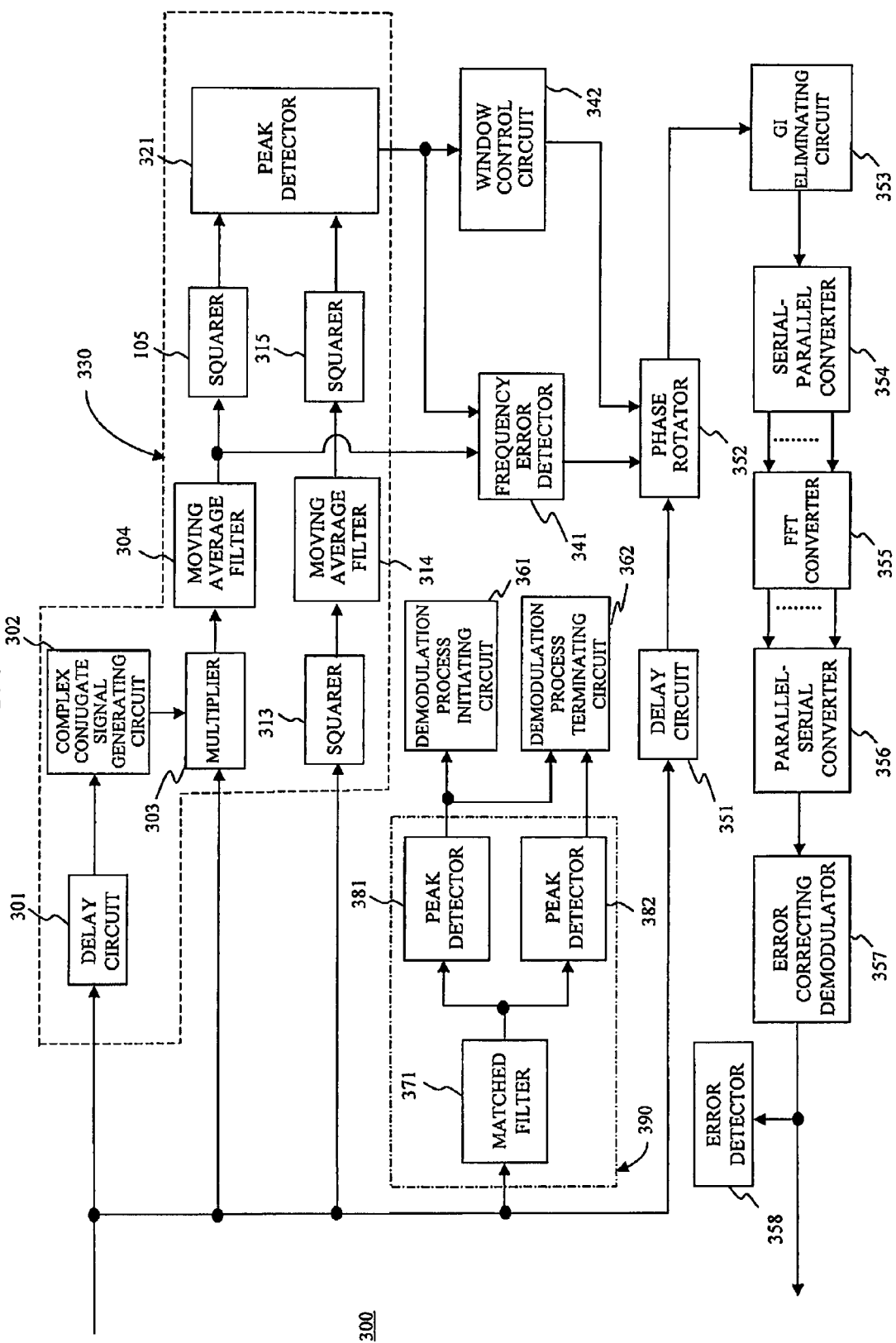
FIG. 7 shows a block diagram of the OFDM demodulation circuit according to yet another embodiment of the invention.

FIG. 7 shows a block diagram of the OFDM demodulation circuit according to another embodiment of the invention.

In the above-described OFDM demodulation circuits 100 and 200, demodulation process initiating circuits 161 and 261 perform the demodulation initiating process based on the correlation value between the OFDM received signal and the signal obtained by delaying the OFDM received signal by time Tw/4, and then the demodulation process that has been started is continued or terminated by demodulation process terminating circuits 162 and 262. In OFDM demodulation circuit 300 of the present embodiment, however, the analysis period corresponds to the length of a delay device provided in a matched filter 371.

In the following description of OFDM demodulation circuit 300 of the present embodiment, parts similar to those of the above-described OFDM modulation circuit 100 are designated with identical numerals as far as the last two digits of the numerals and are not described.

In OFDM demodulation circuit 300 of the present embodiment, the OFDM received signal is fed to matched filter 371, in addition to a delay circuit 301, a multiplier 303, a squarer 313, and a delay circuit 351.

Figure 10:
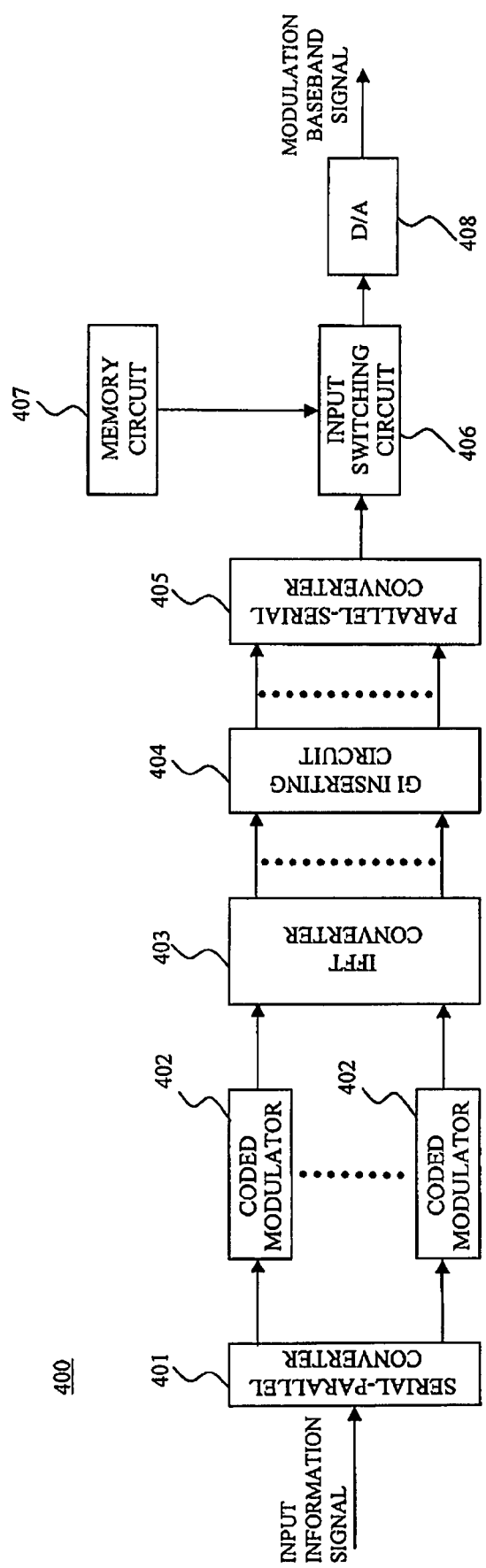
FIG. 10 shows a block diagram of a conventional OFDM modulation circuit.
Figure 11:
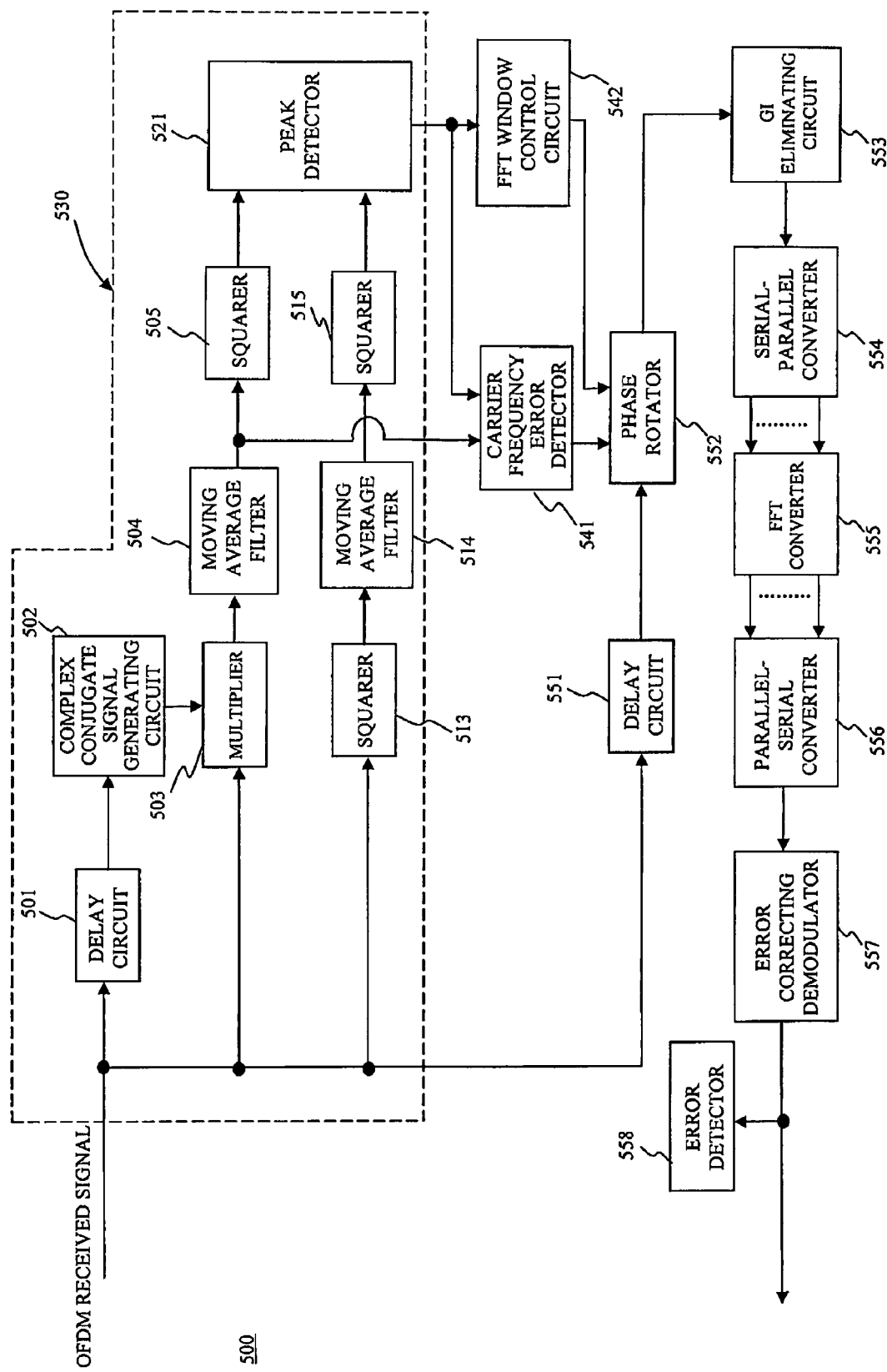
FIG. 11 shows a block diagram of a conventional OFDM demodulation circuit.

Matched filter 371 is adapted to output a correlation value between preamble data of the OFDM received signal and preamble data attached to the transmitted OFDM signal (the latter preamble data, which is identical to the preamble data stored in memory circuit 407 in OFDM modulation circuit 400 shown in FIG. 10, consists of a signal sequence that is prepared in advance), via the delay device (not shown) thereof.

The output signal from the delay device provided in matched filter 371 is branched and fed to peak detectors 381 and 382. An output signal from one peak detector 381 is fed to a demodulation process initiating circuit 361, while an output signal from the other peak detector 382 is fed to a demodulation process terminating circuit 362.

Figure 8:
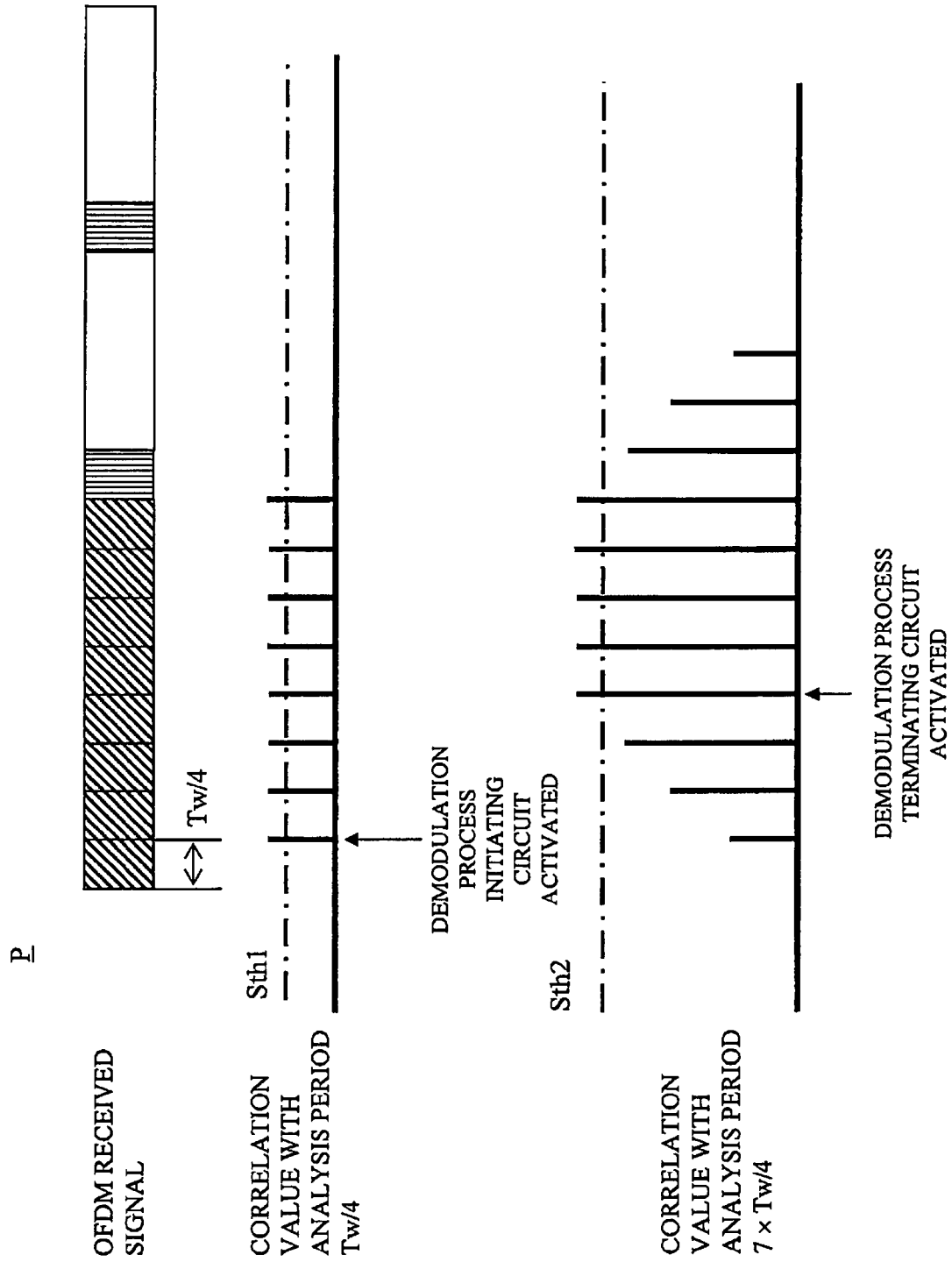
FIG. 8 shows correlation values outputted from a matched filter 371 in the case of the analysis period of Tw/4 and that of 7×Tw/4 at time t.
Figure 9:
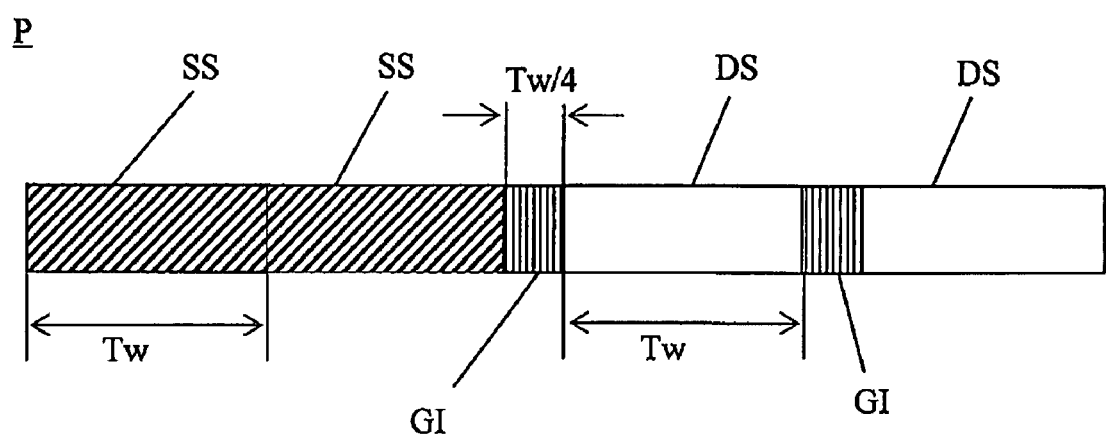
FIG. 9 shows an example of the frame format of a packet used in a conventional OFDM demodulation circuit.

FIG. 8 shows the correlation values outputted from matched filter 371 in cases where the analysis period is Tw/4 and 7×Tw/4 at time t.

Peak detector 381 detects the peak of the output signal from matched filter 371 using the analysis period, namely the length of the delay device in matched filter 371 of interest, of Tw/4, and then compares it with preset threshold Sth1. Threshold value Sth1 is set at a low value in accordance with the analysis period Tw/4. Thus, in response to the reception of the OFDM received signal, peak detector 381 can detect a peak value of the length of the delay device in matched filter 371 without delay, so that the demodulation process can be started quickly.

On the other hand, peak detector 382 detects the peak of the output signal from matched filter 371 using the analysis period, namely the length of the delay device in matched filter 371, of 7×Tw/4, and then compares the peak value with preset threshold value Sth2. Threshold value Sth2 is set to be higher than threshold value Sth1 of peak detector 381 because if the value of threshold Sth2 is set to be too low, the possibility of detecting the peak value of the length of the delay device in matched filter 371 at a wrong position increases due to the influence of noise or adjacent channel interference. By thus making the analysis period longer than that of peak detector 381, the peak value can be detected more accurately.

Upon reception of an output signal from peak detector 381, demodulation process initiating circuit 361 initiates a demodulation process.

Upon reception of the output signal from peak detector 381, demodulation terminating circuit 362 starts counting predetermined time T. If an output signal based on the peak detection is not received from peak detector 382 within the counting period of predetermined time T, demodulation process terminating circuit 362 terminates the demodulation process that has been started.

Thus, in the present embodiment, it can be considered that a symbol timing signal detector 330 is constituted by the above-described delay circuit 301, complex conjugate signal generating circuit 302, multiplier 303, moving average filter 304a, squarer 305a, squarer 313, moving average filter 314, squarer 315 and peak detector 321. It can also be considered that a symbol timing signal analyzer 390 is constituted by the above-described matched filter 371, and peak detectors 381 and 382.

Thus, OFDM demodulation circuit 300 of the present embodiment differs from OFDM demodulation circuits 100 and 200 shown in FIGS. 1 and 5 only in that the correlation signal fed to peak detectors 381 and 382 is generated by matched filter 371. OFDM demodulation circuit 300 operates in the same manner as described with reference to FIG. 4, and achieves the same effect as that provided by OFDM demodulation circuits 100 and 200.

While the present invention has been described with reference to OFDM demodulation circuits 100, 200 and 300, the invention is not limited to those specific embodiments.

Further, while the invention has been described with reference to OFDM demodulation circuits, the invention may be embodied as OFDM reception apparatus to which the OFDM demodulation circuits have been applied.

INDUSTRIAL APPLICABILITY

In accordance with the invention, the analysis period, namely the period of observation of the received signal, can be shortened during the demodulation of an OFDM received signal. Thus, the OFDM received signal can be detected early so that the demodulation process for the OFDM received signal can also be initiated early.

In case the demodulation process is initiated erroneously, the error can be detected quickly and the demodulation process can be terminated so as to restore the OFDM received signal awaiting state. Thus, the signal detection accuracy does not deteriorate.

Thus, the demodulation process can be initiated swiftly while reducing the possibility of failing to detect the OFDM received signal.

The invention claimed is:

1. An OFDM demodulation circuit for receiving and demodulating an OFDM signal comprising a plurality of orthogonal carrier waves, said circuit comprising:

correlation means for determining a correlation value between an OFDM received signal prior to demodulation and a signal obtained by delaying the OFDM received signal prior to demodulation;

peak detection means for detecting, on the basis of a correlation value obtained by said correlation means, a peak position of a correlation value for initiating a demodulation process and a peak position of a correlation value for continuing the demodulation process; and demodulation process terminating means for terminating the demodulation of the OFDM received signal in accordance with the result of analysis in said peak detection means, wherein said peak detection means is adapted such that T1<T2, where T1 is an analysis period for the peak position of the correlation value for initiating the demodulation process, and T2 is an analysis period for the peak position of the correlation value for continuing the demodulation process.

2. An OFDM demodulation circuit for receiving and demodulating an OFDM signal comprising a plurality of orthogonal carrier waves, said circuit comprising:

correlation means for determining a correlation value between an OFDM received signal prior to demodulation and a signal sequence that is prepared in advance in accordance with the OFDM scheme of interest;

peak detection means for detecting, on the basis of the correlation value obtained by said correlation means, a peak position of a correlation value for initiating a demodulation process and a peak position of a correlation value for continuing the demodulation process; and demodulation process terminating means for terminating the demodulation of the OFDM received signal in accordance with the result of analysis in said peak detection means, wherein said peak detection means is adapted such that T1<T2, where T1 is an analysis period for the peak position of the correlation value for initiating the demodulation process, and T2 is an analysis period for the peak position of the correlation value for continuing the demodulation process.

3. The OFDM demodulation circuit according to claim 1, wherein said correlation means is adapted to delay the OFDM received signal prior to demodulation by a delay time that is not more than a window time width Tw that is used for demodulating the OFDM received signal.

4. The OFDM demodulation circuit according to any one of claims 1 to 3, wherein said peak detection means is adapted such that Sth1<Sth2, where Sth1 is a detection threshold value of the peak position of the correlation value for initiating the demodulation process, and Sth2 is a detection threshold value of the peak position of the correlation value for continuing the demodulation process.

5. The OFDM demodulation circuit according to any one of claims 1 to 3, wherein said demodulation process terminating means terminates the demodulation process if the peak position of the correlation value for continuing the demodulation process is not detected by said peak detection means within a predetermined period of time following the detection by said peak detection means of the peak position of the correlation value for initiating the demodulation process.

6. An OFDM reception apparatus comprising the OFDM demodulation circuit according to any one of claims 1 to 3.

7. The OFDM demodulation circuit according to any one of claims 1 to 3, wherein said peak detection means is adapted such that Sth1<Sth2, where Sth1 is a detection threshold value of the peak position of the correlation value for initiating the demodulation process, and Sth2 is a detection threshold value of the peak position of the correlation value for continuing the demodulation process; and wherein said demodulation process terminating means terminates the demodulation process if the peak position of the correlation value for continuing the demodulation process is not detected by said peak detection means within a predetermined period of time following the detection by said peak detection means of the peak position of the correlation value for initiating the demodulation process.

8. An OFDM reception apparatus comprising the OFDM demodulation circuit according to claim 4.

9. An OFDM reception apparatus comprising the OFDM demodulation circuit according to claim 1.

10. An OFDM reception apparatus comprising the OFDM demodulation circuit according to claim 2.

* * * * *